United States Patent [19]

Kamimura et al.

[11] Patent Number: 4,854,745

[45] Date of Patent: Aug. 8, 1989

[54] THRUST BEARING MADE OF SYNTHETIC RESIN

[75] Inventors: Hiroto Kamimura, Fujisawa; Shuichi Kubota, Yokohama; Masaru Iwakura, Ayase, all of Japan

[73] Assignee: Oiles Industry Co., Ltd., Tokyo, Japan

[21] Appl. No.: 89,127

[22] Filed: Aug. 25, 1987

[30] Foreign Application Priority Data

Sep. 1, 1986 [JP] Japan .............................. 61-133931[U]
Sep. 1, 1986 [JP] Japan .............................. 61-133932[U]
Dec. 23, 1986 [JP] Japan .............................. 61-196803[U]
Dec. 23, 1986 [JP] Japan .............................. 61-196804[U]
Jan. 19, 1987 [JP] Japan .............................. 62-5956[U]
Jan. 19, 1987 [JP] Japan .............................. 62-5957[U]
Jan. 27, 1987 [JP] Japan .............................. 62-10127[U]

[51] Int. Cl.$^4$ .......................... F16C 17/04; F16C 33/74
[52] U.S. Cl. ..................................... 384/420; 384/124; 384/130; 384/607
[58] Field of Search .......................... 384/121, 123–125, 384/226–228, 303, 420–427, 590, 607, 130–153

[56] References Cited

U.S. PATENT DOCUMENTS

| 3,120,982 | 2/1964 | LeBlanc | 384/420 |
| 3,725,973 | 4/1973 | Gwozdz | 384/420 X |
| 4,239,301 | 12/1980 | Pannwitz | 384/125 |
| 4,319,768 | 3/1982 | Youngdale | 384/125 X |
| 4,415,166 | 11/1983 | Beia | 277/51 |

FOREIGN PATENT DOCUMENTS 2658743 6/1978 Fed. Rep. of Germany .
56-94021 7/1981 Japan .
58-7136 2/1983 Japan .

Primary Examiner—Thomas R. Hannon
Attorney, Agent, or Firm—Mason, Fenwick & Lawrence

[57] ABSTRACT

A thrust bearing made of synthetic resin assembled into a strut-thrust type suspension for use in four wheel cars, comprising a casing made of synthetic resin and a bearing body made of synthetic resin, the bearing body being fitted rotatably to the casing by snap-fitting a hook portion of a suspended portion with an engaging portion of a protruded portion, the suspended portion being formed integrally with an outer circumferential edge of the casing, the protruded portion being formed integrally with an outer circumferential edge of the bearing body.

3 Claims, 17 Drawing Sheets

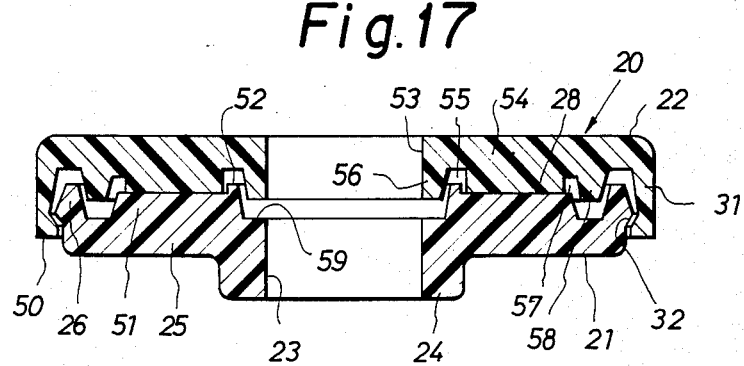
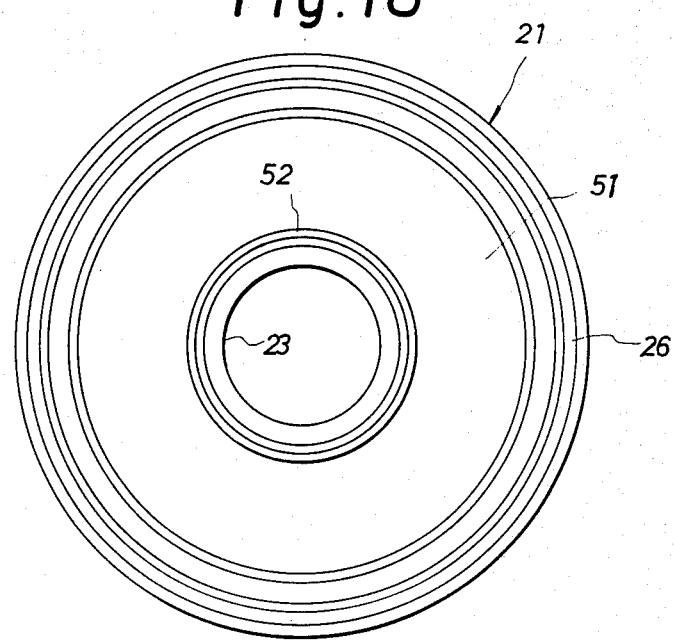

THRUST BEARING MADE OF SYNTHETIC RESIN

The present invention concerns a thrust bearing made of synthetic resin, particularly, it relates to a thrust bearing made of synthetic resin assembled into a strut-thrust type suspension (MacPherson type) for use in four wheel cars.

Generally, a strut-thrust type suspension is mainly used for the front wheels of four wheel cars in which coil springs are combined with a strut assembly incorporating an oil pressure type shock absorber in an outer cylinder integrated with a main shaft. The suspension described above includes such a type in which a piston rod of a strut assembly is rotated when the assembly is rotated together with coil springs by a steering operation and another type in which the piston rod is not rotated. In both of the types, a thrust bearing is required between the mounting member of the assembly to a vehicle body and the upper spring seat of the coil assembly for allowing the smooth rotation of the strut assembly.

Roller bearings using balls or needles, or sliding type thrust bearings made of synthetic resin have been employed so far in these portions.

A dust seal made of an elastic rubber member is mounted at the outer circumference of the sliding surface for the thrust bearing made of synthetic resin for preventing the intrusion of dust or the like from the outside of the bearing to the sliding surface.

In the prior art described above, since a dust seal is disposed to the outer circumference of the sliding surface for the thrust bearing, there is a drawback that the sliding frictional force is increased upon steering operation thereby requiring great steering force.

The present invention is achieved in order to overcome the foregoing drawback in the prior art and it is an object of the invention to obtain a thrust bearing made of synthetic resin capable of preventing the intrusion of dust or the like without using dust seals made of elastic rubber members and thereby preventing increase of the steering power upon steering operation.

The foregoing object can be attained by the following constitutions in accordance with the present invention, that is:

a first thrust bearing made of synthetic resin comprising a casing made of synthetic resin and a bearing body made of synthetic resin fitted to the casing, the casing including a cylindrical portion having a penetration aperture being along a longitudinal direction thereof, a large width collar portion formed integrally with an outer circumferential surface of the cylindrical portion, an annular protruded portion formed integrally with an outer circumferential edge of the large width collar portion and an engaging portion formed to an outer circumferential surface of the protruded portion, the bearing body including a cylindrical bearing portion, an inner collar portion formed integrally with an upper end of an inner circumferential surface of the bearing portion, an outer collar portion formed integrally with an upper end of an outer circumferential surface of the bearing portion, an annular suspended portion formed integrally with a circumferential edge of the outer collar portion and an engaging hook portion formed at a lower end of the suspended portion, the bearing body being fitted rotatably to the casing by snap-fitting the hook portion of the suspended portion with the engaging portion of the protruded portion such that a lower surface of the bearing portion is slidably abutted against an upper surface of the large width collar portion of the casing, whereby a tight seal is formed in the snap-fit portion;

a second thrust bearing made of synthetic resin comprising a casing made of synthetic resin and a bearing body made of synthetic resin fitted to the casing, the casing including a cylindrical portion having a penetration aperture being along a longitudinal direction thereof, a large width collar portion formed integrally with an outer circumferential surface of the cylindrical portion, an annular protruded portion formed integrally with an outer circumferential edge of the large width collar portion, an annular protruded portion formed integrally with an outer circumferential edge of the large width collar portion, an engaging portion formed to an outer circumferential surface of the annular protruded portion and an annular lower lip portion formed coaxially with the penetration aperture at an upper surface of the large width collar portion and defining an annular groove in cooperation with one end of the cylindrical portion, the bearing body including a cylindrical bearing portion, an inner collar portion formed integrally with an upper end of an inner circumferential surface of the bearing portion, an outer collar portion formed integrally with an upper end of an outer circumferential surface of the bearing portion, an annular suspended portion formed integrally with a circumferential edge of the outer collar portion, a engaging hook portion formed at a lower end of the suspended portion and an annular upper lip portion formed coaxially with the bearing portion at a lower surface of the outer collar portion, the bearing body being fitted rotatably to the casing by snap-fitting the hook portion of the suspended portion with the engaging portion of the protruded portion such that a lower surface of the bearing portion is slidably abutted against a bottom surface of the groove and an end of the upper lip portion is overlapped radially with the lower lip portion, whereby tight seals are formed in the snap-fit portion and in the upper and lower lip portions respectively;

a third thrust bearing made of synthetic resin comprising a casing made of synthetic resin and a bearing body made of synthetic resin fitted to the casing, the casing including a cylindrical portion having a penetration aperture being along a longitudinal direction thereof, an annular first lower lip portion disposed to an upper end surface of the cylindrical portion and having an aperture of a diameter enlarging with a step from the penetration aperture, a large width collar portion formed integrally with an outer circumferential surface of the cylindrical portion, an annular protruded portion formed integrally with an outer circumferential edge of the large width collar portion, an engaging portion formed to an circumferential surface of the protruded portion and an annular second lower lip portion formed coaxially with the penetration aperture to an upper surface of the large width collar portion and defining an annular groove in cooperation with the first lower lip portion, the bearing body including a cylindrical bearing portion, an inner collar portion formed integrally with an upper end of an inner circumferential surface of the bearing portion, an annular first upper lip portion formed integrally with an inner circumferential edge of the inner collar portion and extended downwardly, an outer collar portion formed integrally with an outer circumferential surface of the bearing portion, an annular suspended portion formed integrally with an circumferential edge of the outer collar portion, an engaging hook portion formed at a lower end of the suspended portion and a second annular upper lip portion formed coaxially with the bearing portion to a lower surface of the outer collar portion, the bearing body being fitted rotatably to the casing by snap-fitting the hook portion of the suspended portion with the engaging portion of the protruded portion such that a lower surface of the bearing portion is slidably abutted against a bottom surface of the groove and ends of the first and second upper lip portions are overlapped radially with ends of the first and second lower lip portions respectively, whereby tight seals are formed in the snap-fit portion, in the first upper and lower lip portions and the second upper and lower lip portions respectively;

a fourth thrust bearing made of synthetic resin comprising a casing made of synthetic resin and a bearing body made of synthetic resin fitted to the casing, the casing including a cylindrical portion having a penetration aperture being along a longitudinal direction thereof, a large width collar portion formed integrally with an outer circumferential surface of the cylindrical portion, an annular protruded portion formed integrally with an outer circumferential edge of the large width collar portion, an engaging step formed to an outer circumferential surface of the annular protruded portion, a substantially cylindrical first bearing portion formed integrally with an upper surface of the large width collar portion and an annular ridge portion formed at an inner circumferential edge of the first bearing portion in continuous with the inner circumferential edge and protruded from an end face of the first bearing portion, the bearing body including a disk-like portion having a circular aperture at a central portion thereof, a cylindrical second bearing portion formed to a lower surface of the disk-like portion, an annular inner protruded portion spaced apart from an inner circumferential surface of the second bearing portion by an annular first groove, protruded at a leading end thereof from an end face of the second bearing portion and formed in continuous with the circular aperture, an annular outer protruded portion spaced apart from an outer circumferential surface of the second bearing portion by an annular second groove and protruded at a leading end thereof from the end face of the second bearing portion and an annular suspended portion formed at an outer circumferential edge of the disk-like portion and having an engaging hook portion at a leading end thereof, the bearing body being fitted rotatably to the casing by snap-fitting the hook portion of the suspended portion to the engaging step of the protruded portion such that the end face of the second bearing portion is abutted slidably against an end face of the first bearing portion and the leading ends of the inner and outer protruded portions are protruded from the end face of the first bearing portion;

a fifth thrust bearing made of synthetic resin comprising a lower casing made of synthetic resin, an upper casing made of synthetic resin and a bearing piece made of synthetic resin disposed within the upper and lower casings, the lower casing including a cylindrical portion having a penetration aperture being along a longitudinal direction thereof, a large width collar portion formed integrally with an outer circumferential surface of the cylindrical portion, an annular protruded portion formed integrally with an outer circumferential edge of the large width collar portion and an engaging portion formed to an outer circumferential surface of the protruded portion, the upper casing including a disk-like flat portion, a circular aperture formed at a center of the disk-like portion, an annular suspended portion formed integrally with an outer circumferential edge of the disk-like portion and an engaging hook portion formed to a lower end of the suspended portion, the bearing piece comprising an annular plate having an inner diameter greater than an outer diameter of the cylindrical portion and an outer diameter smaller than an inner diameter of the protruded portion, the upper casing being fitted rotatably to the lower casing by snap-fitting the hook portion of the suspended portion with the engaging portion of the protruded portion such that an upper surface of the bearing piece is slidably abutted against a lower surface of the flat portion and a lower surface of the bearing piece is slidably abutted against an upper surface of the large width collar portion;

a sixth thrust bearing made of synthetic resin comprising a lower casing made of synthetic resin, an upper casing made of synthetic resin and a bearing piece made of synthetic resin disposed within the upper and lower casings, the lower casing including a cylindrical portion having a penetration aperture being along a longitudinal direction thereof, a large width collar portion formed integrally with an outer circumferential surface of the bearing portion, an annular protruded portion formed integrally with an outer circumferential edge of the large width collar portion, an engaging portion formed to an outer circumferential surface of the protruded portion and an annular lower lip portion formed coaxially with the penetration aperture at an upper surface of the large width collar portion and defining an annular groove in cooperation with one end of the cylindrical portion, the upper casing including a disk-like flat portion, a circular aperture formed at a center of the disk-like portion, an annular suspended portion formed integrally with an outer circumferential edge of the disk-like portion, an engaging hook portion formed at a lower end of the suspended portion and an annular upper lip portion formed coaxially with the circular aperture at a lower surface of the disk-like portion, the bearing piece comprising an annular plate having an inner diameter greater than an outer diameter of the cylindrical portion and an outer diameter smaller than an inner diameter of the lower lip portion, the upper casing being fitted rotatably to the lower casing by snap-fitting the hook portion of the suspended portion with the engaging portion of the protruded portion such that an upper surface of the bearing piece is slidably abutted against a lower surface of the disk-like portion and a lower surface of the bearing piece is slidably abutted against a bottom surface of the groove whereby tight seals are formed in the snap-fit portion and in the upper and lower lip portions; and a seventh thrust bearing made of synthetic resin comprising a lower casing made of synthetic resin, an upper casing made of synthetic resin and a bearing piece made of synthetic resin disposed within the upper and lower casings, the lower casing including a cylindrical portion having a penetration aperture being along a longitudinal direction thereof, an annular first lower lip portion disposed to an upper end face of the cylindrical portion and having an aperture of a diameter enlarging with a step from the penetration aperture, a large width collar portion formed integrally with an outer circumferential surface of the cylindrical portion, an annular protruded portion formed integrally with an outer circumferential edge of the large width collar portion, an engaging portion formed to an outer circumferential surface of the protruded portion, an annular second lower lip portion formed coaxially with the penetration aperture at an upper surface of the large width collar portion and defining an annular groove in corporation with the first lower lip portion, the upper casing including a disc-like flat portion, a circular aperture formed at a center of the disk-like portion, an annular first upper lip portion formed integrally with an inner circumferential edge of the disk-like portion and extended downwardly, an annular suspended portion formed integrally with an outer circumferential edge of the disk-like portion, an engaging hook portion formed at a lower end of the suspended portion and an annular second upper lip portion formed coaxially with the circular aperture to a lower surface of the flat portion, the bearing piece comprising an annular plate having an inner diameter greater than an outer diameter of the first lower lip portion and an outer diameter smaller than an inner diameter of the second lower lip portion, the upper casing being fitted rotatably to the lower casing by snap-fitting the hook portion of the suspended portion with the engaging portion of the protruded portion such that an upper surface of the bearing piece is slidably abutted against a lower surface of the flat portion and ends of the first and second upper lip portions are overlapped radially with ends of the first and second lower lip portions respectively and a lower surface of the bearing piece is slidably abutted against a bottom surface of the groove, whereby tight seals are formed in the snap-fit portion, in the first upper and lower lip portions and in the second upper and lower lip portions respectively.

According to the first thrust bearing of the present invention, advantageous effects as described below can be obtained. Since tight seals are formed by the labyrinth effect in the snap-fit portion between the engaging portion of the casing and the engaging hook portion of the bearing body, intrusion of dust or the like to the sliding face of the bearing can be prevented. In addition, since dust seals made of elastic rubber member used so far can be deleted, undesirable increase in the steering force upon steering operation due to the dust seals can be avoided and smooth steering operation is possible for a long period of time.

Moreover, since the casing and the bearing body can be engaged by snap-fitting, the assembly work can be conducted extremely easily.

According to the second thrust bearing of the present invention, advantageous effects as described below can be obtained. Since double tight seals are formed by the labyrinth effect in the snap-fit portion between the engaging portion of the casing and the engaging hook portion of the bearing body, and in the overlapped portion between the upper and lower lip portions respectively intrusion of dust or the like to the sliding face of the bearing can be prevented. In addition, since dust seals made of elastic rubber member used so far can be deleted, undesired increase in the steering force upon steering operation due to the dust seals can be avoided and smooth steering operation is possible for a long period of time.

Further, since the casing and the bearing body can be engaged by snap-fitting, the assembly work can be conducted extremely easily.

According to the third thrust bearing of the present invention, advantageous effects as described below can be obtained. Since triple tight seals are formed by the labyrinth effect in the snap-fit portion between the engaging portion of the casing and the engaging hook portion of the bearing body and in the overlapped portions between the first upper and lower lip portions and between the second upper and lower lip portions respectively, intrusion of dust or the like from the inner and outer circumferential surfaces of the bearing to the sliding face of the bearing can be prevented. Moreover, since dust seals made of elastic rubber member used so far can be deleted, undesirable increase in the steering force upon steering operation due to the dust seals can be avoided and smooth steering operation is possible for a long period of time.

Further, since the casing and the bearing body can be engaged by snap-fitting, the assembly work can be conducted extremely easily.

According to the fourth thrust bearing of the present invention, advantageous effects as described below can be obtained. Since the sliding contact face of the bearing is formed at a position higher than the upper surface of the large width collar portion of the casing and the inner and outer protruded portions of the bearing body are protruded from the sliding face, the sliding face can be protected against the intrusion of dust or the like from the outside by the labyrinth effect due to the tight seal formed to the inner and outer circumferential edges of the sliding face and the tight seal formed in the snap-fit portion between the bearing body and the casing. Further, since the casing and the bearing body can be fitted by a snap-fitting, the assembly work can be conducted extremely easily.

According to the fifth thrust bearing of the present invention, advantageous effects as described below can be obtained. Since tight seals are formed by the labyrinth effect in the snap-fit portion between the engaging portion of the upper casing and the engaging hook portion of the lower casing, intrusion of dust or the like to the sliding face of the bearing can be prevented. In addition, since dust seals made of elastic rubber member used so far can be deleted, undesirable increase in the steering force upon steering operation due to the dust seals can be avoided and smooth steering operation is possible for a long period of time.

Further, since the upper casing and the lower casing can be engaged by snap-fitting, the assembly work can be conducted extremely easily.

According to the sixth thrust bearing of the present invention, advantageous effects as described below can be obtained. Since double tight seals are formed by the labyrinth effect in the snap-fit portion between the engaging portion of the upper casing and the engaging hook portion of the lower casing and in the overlapped portion between the upper and lower lip portions respectively, intrusion of dust or the like to the sliding face of the bearing can be prevented. In addition, since dust seals made of elastic rubber member used so far can be deleted, undesirable increase in the steering force upon steering operation due to the dust seals can be avoided and smooth steering operation is possible for a long period of time.

Further, since the upper casing and lower casing can be engaged by snap-fitting, the assembly work can be conducted extremely easily.

According to the seventh thrust bearing of the present invention, advantageous effects as described below can be obtained. Since triple tight seals are formed by the labyrinth effect in the snap-fit portion between the engaging portion of the upper casing and the engaging hook portion of the lower casing and in the overlapped portion between the first upper and lower lip portions and between the second upper and lower lip portions respectively, intrusion of dust or the like from the inner and outer circumferential surfaces of the bearing to the sliding face of the bearing can be prevented. In addition, since dust seals made of elastic rubber member used so far can be deleted, undesirable increase in the steering force upon steering operation due to the dust seals can be avoided and smooth steering operation is possible for a long period of time.

Further, since the upper casing and lower casing can be engaged by snap-fitting, the assembly work can be conducted extremely easily.

In the constitution of the thrust bearing according to the present invention as described above, it is necessary that the synthetic resin constituting the casing, the upper casing and the lower casing is excellent in mechanical properties such as abrasion resistance, impact shock resistance and creep resistance. Further, it is particularly preferred that the bearing body slidably fitted to the casing or the bearing piece disposed within the upper and lower casings has a self-lubricity, and there can be used preferably, for example, polyacetal resin, polyamide resin, polyester resin, such as polybutylene terephthalate (PBT) and polyolefine resin such as polyethylene and polypropylene, as well as polycarbonate resin. Similar synthetic resin to that for the bearing body or the bearing piece can be used for the casing, the upper casing and the lower casing and it is desirable to use a synthetic resin material that exhibits preferable friction characteristics when combined with the synthetic resin used for the bearing body or the bearing piece and shows a relatively high rigidity.

Examples of desirable combination of resins are as shown in the table below.

TABLE

| Bearing body or bearing piece | Casing, upper casing or lower casing | Friction coefficient | Abrasion amount (mm) |
|---|---|---|---|
| polyacetal | polyamide | 0.05 | 0.020 |
| polyamide | polyacetal | 0.04 | 0.021 |
| polyethylene | polyacetal | 0.04 | 0.038 |
| polycarbonate | polyacetal | 0.06 | 0.050 |
| polyacetal | PBT | 0.07 | 0.045 |
| polyacetal | polyacetal | 0.06 | 0.025 |
| polyacetal | steel | 0.11 | 0.095 |

In the table, the frictional characteristics show the result obtained under the following test conditions.

Test Condition

Thrust load: 350 Kg, angle of swing: ±35°, velocity of swing: 60 cpm, lubrication: silicon grease was coated on the sliding face upon starting.

The abrasion amount indicates the amount of dimensional change (mm) in the bearing body or the bearing piece after conducting 1,000,000 cycles of the test.

If the combination of the synthetic resins for the casing and the bearing body, or the combination of the synthetic resin for the upper and lower casings and the bearing piece is preferably selected as described above, since the sliding face of the bearing is constituted with the combination of synthetic resins excellent in the self-lubricity, the friction coefficient is low and stable steering power can be maintained for a long period of time.

This invention will be explained more specifically while referring to the accompanying drawings, by which the foregoing objects as well as the constitutions of the present invention will become more apparent.

Specific embodiments to be explained hereinafter are given for easy understanding of the present invention and various modifications may be possible by those skilled in the art without departing the scope of the present invention as clearly shown in the scope of the claim for patent.

FIG. 17 is a longitudinal cross sectional view of one embodiment of the fourth thrust bearing according to the present invention;

FIG. 18 is a plan view for the casing shown in FIG. 17;

Figure 1:
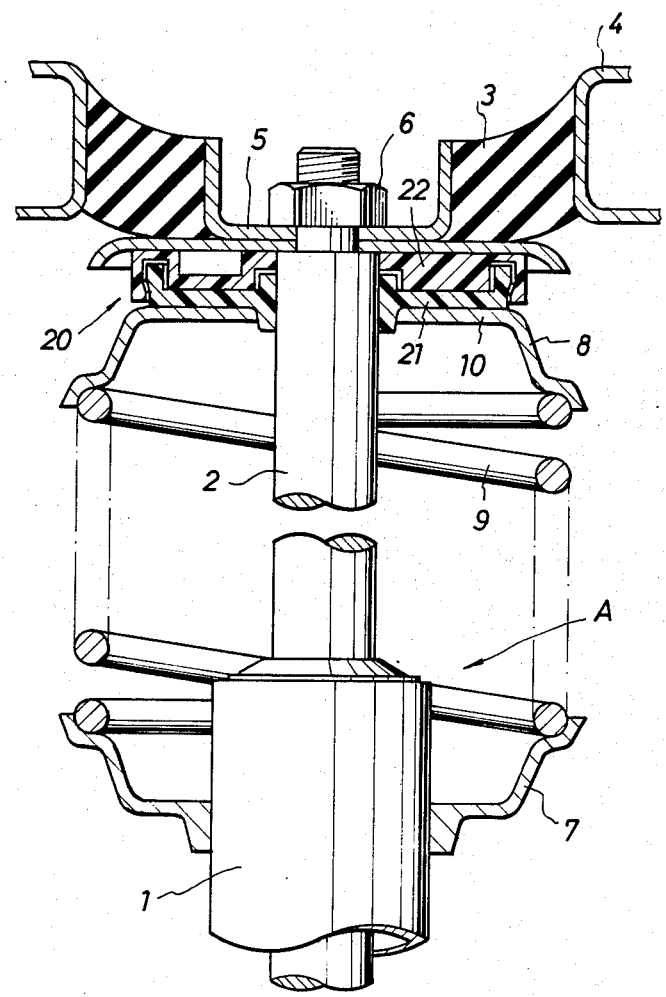
FIG. 1 is a longitudinal cross sectional view of a strut assembly equipped with a first thrust bearing according to the present invention.

In FIG. 1, a thrust assembly A comprises a strut 1 incorporating a shock absorber and a piston rod 2 inserted at one end into the shock absorber of the strut 1 and protruded at the other end from the shock absorber. The other end of the rod 2 is secured by means of a nut 6 to a mounting member 5 supported to a vehicle body 4 by way of a mount insulator 3 made of elastic rubber material.

A lower spring seat 7 is secured to the outer circumferential surface of the strut 1, while an upper spring seat 8 is disposed opposing to the seat 7 and loosely engaged to the outer circumferential surface of the rod 2. A coil spring 9 is disposed between the upper and the lower seats 7 and 8.

A first thrust bearing 20 made of synthetic resin of the present invention is disposed between the flat portion 10 of the seat 8 and the mounting members 5, and the thrust bearing 20 comprises a casing 21 made of synthetic resin and a bearing body 22 made of synthetic resin slidably fitted to the casing 21.

Figure 2:
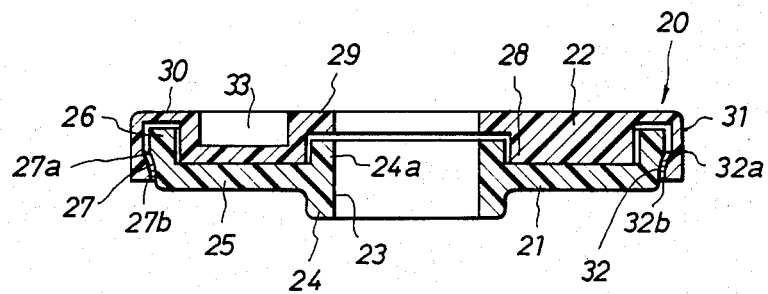
FIG. 2 is a longitudinal cross sectional view of one embodiment of the first thrust bearing according to the present invention.
Figure 3:
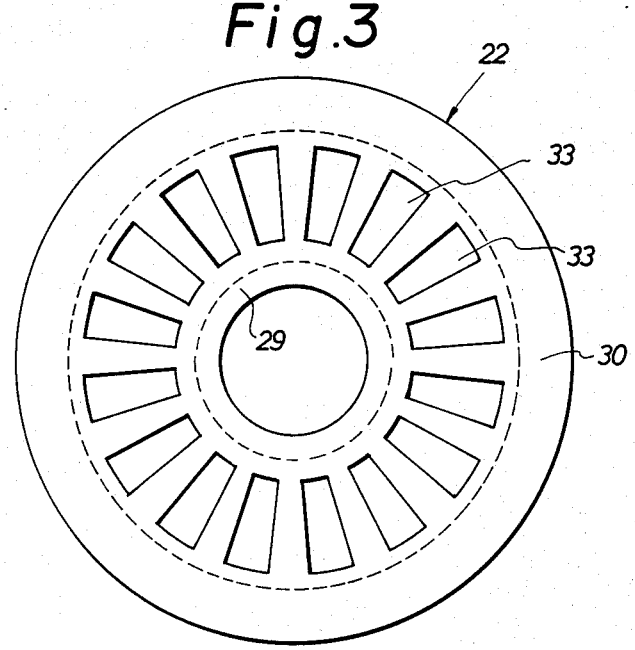
FIG. 3 is a plan view for the bearing body shown in FIG. 2.
Figure 4:
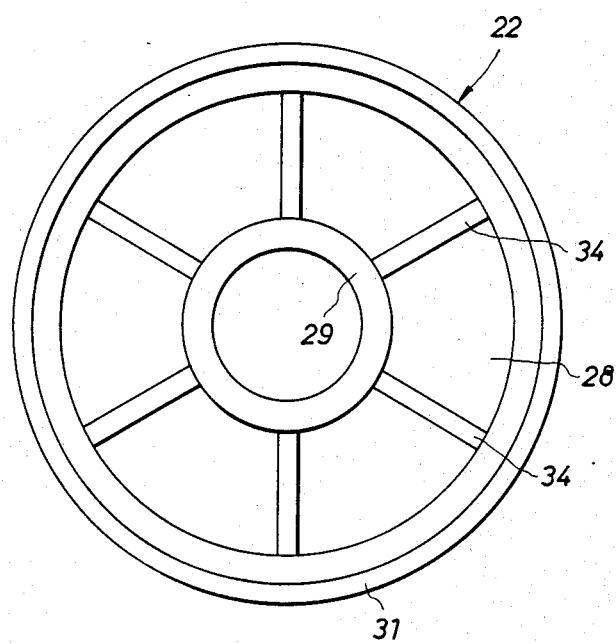
FIG. 4 is a bottom view for the bearing body shown in FIG. 2.
Figure 5:
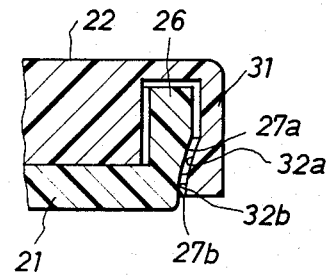
FIG. 5 is an enlarged cross sectional view for a part in a snap-fit portion shown in FIG. 2.
Figure 6:
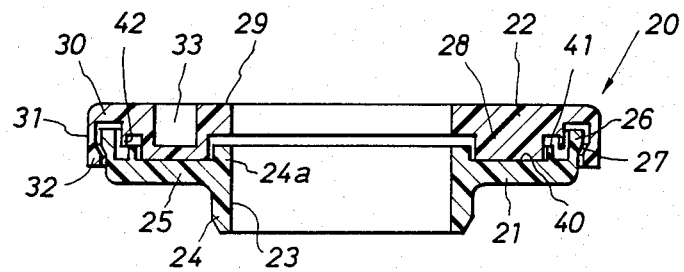
FIG. 6 is a longitudinal cross sectional view of one embodiment of the second thrust bearing according to the present invention.
Figure 7:
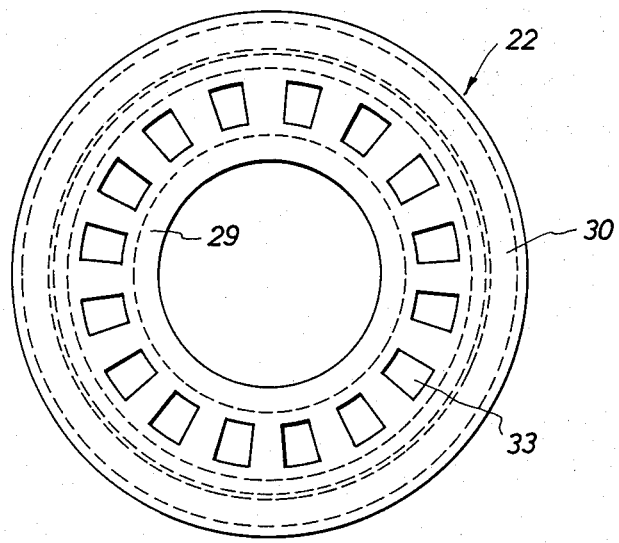
FIG. 7 is a plan view for the bearing body shown in FIG. 6.
Figure 8:
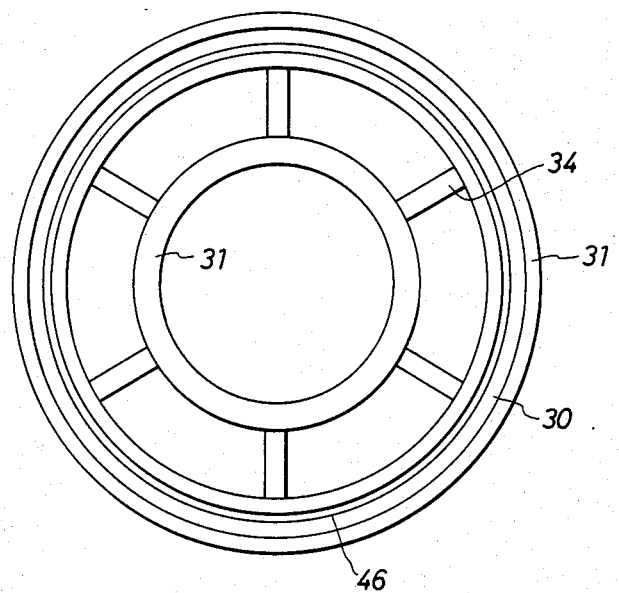
FIG. 8 is a bottom view for the bearing body shown in FIG. 6.
Figure 9:
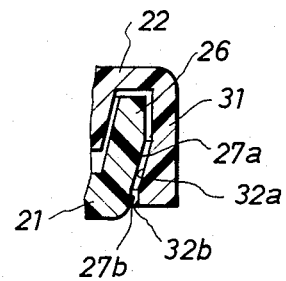
FIG. 9 is an enlarged cross sectional view for a part in a snap-fit portion shown in FIG. 6.

Explanation will be made specifically for one embodiment of a first thrust bearing according to the present invention referring to FIGS. 2 through 4 of the accompanying drawings.

A thrust bearing 20 comprises a casing 21 made of synthetic resin and a bearing body 22 made of synthetic resin slidably fitted to the casing 21.

The casing 21 includes a cylindrical portion 24 having a penetration aperture 23 being along a longitudinal direction thereof, a large width collar portion 25 formed integrally with an outer circumferential surface of the cylindrical portion 24 in a state where one end 24a of the cylindrical portion 24 is protruded therefrom, an annular protruded portion 26 formed integrally with an outer circumferential edge of the collar portion 25 and an engaging portion 27 formed to an outer circumferential surface of the protruded portion 26. The collar portion 25 may be formed at a lower end of the cylindrical portion 24.

The engaging portion 27 consists of a tapered surface portion 27a formed from the outer circumferential surface of the protruded portion 26 to an lower surface of the collar portion 25 and a cylindrical surface portion 27b in contiguous with the tapered surface portion 27a and reaching the lower surface of the collar 25.

The bearing body 22 made of synthetic resin includes a cylindrical bearing portion 28, an annular inner collar portion 29 formed integrally with an upper end of an inner circumferential surface of the cylindrical bearing portion 28, an annular outer collar portion 30 formed integrally with an upper end of the outer circumferential surface of the bearing portion 28, an annular suspended portion 31 formed integrally with an circumferential edge of the collar portion 30 and an engaging hook portion 32 formed at a lower end of the suspended portion 31. The hook portion 32 consists of a tapered surface portion 32a corresponding to the tapered surface portion 27a that constitutes the engaging portion 27 of the casing 21 and a cylindrical surface portion 32b in continuous with the tapered surface portion 32a and corresponding to the cylindrical surface portion 27b of the engaging portion 27.

The bearing body 22 is fitted rotatably to the casing 21 by snap-fitting the hook portion 32 of the suspended portion 31 with the engaging portion 27 of the casing 21, whereby a tight seal is formed by the labyrinth effect in the snap-fit portion.

A plurality of recesses 33 are formed radially at the upper surface of the bearing portion 28 of the bearing body 22, so that the thickness of the bearing body 22 is made uniform as much as possible by the recesses 33.

A plurality of grooves 34 are formed each at a circumferential pitch at the lower surface of the bearing portion 28 of the bearing body 22 and each groove 34 is formed radially from the inner circumferential surface to the outer circumferential surface, and the grooves 34 constitute an oil reservoir for grease or like other lubricant. The bearing body 22 is fitted to the casing 21 such that the lower surface of the bearing portion 28 is slidably abutted against the upper surface of the collar portion 25 of the casing 21.

Explanation will be made specifically for one embodiment of the second thrust bearing according to the present invention referring to FIGS. 6 through 9 of the accompanying drawings.

A thrust bearing 20 comprises a casing 21 made of synthetic resin and a bearing body 22 made of synthetic resin slidably fitted to the casing 21.

The casing 21 includes a cylindrical portion 24 having a penetration aperture 23 being along a longitudinal direction thereof, a large width collar portion 25 formed integrally with an outer circumferential surface at the end of the cylindrical portion 24 in a state where one end 24a of the cylindrical portion 24 is protruded therefrom, an annular protruded portion 26 formed integrally with an outer circumferential edge of the collar portion 25, an engaging portion 27 formed to an outer circumferential surface of the protruded portion 26 and an annular lower lip portion 41 formed coaxially with the penetration aperture 23 at an upper surface of the collar portion 25 and defining an annular groove 40 in cooperation with one end 24a of the cylindrical portion 24.

The engaging portion 27 consists of a tapered surface portion 27a formed from the outer circumferential surface of the protruded portion 26 to a lower surface of the collar portion 25 and a cylindrical surface portion 27b in continuous with the tapered surface portion 27a and reaching the lower surface of the collar portion 25.

The bearing body 22 includes a cylindrical bearing portion 28, an annular inner collar portion 29 formed integrally with an upper end of an inner circumferential surface of the bearing portion 28, an annular outer collar portion 30 formed integrally with the upper end of the outer circumferential surface of the bearing portion 28, an annular suspended portion 31 formed integrally with the outer circumferential edge of the collar portion 30, an engaging hook portion 32 formed at a lower end of the suspended portion 31 and an annular upper lip portion 42 formed coaxially with the bearing portion 28 at a lower surface of the collar portion 30 and having an inner diameter larger than an outer diameter of the annular lower lip portion 41 formed to an upper surface of the collar portion 25 of the casing 21.

The hook portion 32 consists of a tapered surface portion 32a corresponding to the tapered surface portion 27a that constitutes the engaging portion 27 of the casing 21 and a cylindrical surface portion 32b in continuous with the tapered surface portion 32a and corresponding to the cylindrical surface portion 27b of the engaging portion 27.

The bearing body 22 is fitted rotatably to the casing 21 by snap-fitting the hook portion 32 of the suspended portion 31 with the engaging portion 27 of the casing 21 and by radially overlapping an end of the upper lip portion 42 with the lower lip portion 41 of the casing 21, whereby tight seals are formed by the labyrinth effect in the snap-fit portion and in the upper and lower lip portions.

A plurality of recesses 33 are formed radially at the upper surface of the bearing portion 28 of the bearing body 22, so that the thickness of the bearing body 22 is made uniform as much as possible by the recesses 33.

A plurality of grooves 34 are formed each at a circumferential pitch at the lower surface of the bearing portion 28 of the bearing body 22 and each groove 34 is formed radially from the inner circumferential surface to the outer circumferential surface, and the grooves 34 constitute an oil reservoir for grease or like other lubricant. The bearing portion 28 of the bearing body 22 is disposed within the groove 40 such that the lower surface of the bearing portion 28 is slidably abutted against the bottom face of the groove 40 of the casing 21.

The sliding face defined with the lower surface of the bearing portion 28 of the bearing body 22 and the bottom face of the groove 40 formed to the casing 21 slidably abutting against the lower surface is protected against the intrusion of dust or the like from the inner circumferential surface of the thrust bearing 20 by the labyrinth effect due to the tight seal formed in the snap-fit portion and in the overlapped portion between the upper and lower lip portions 42, 41 respectively.

Figure 10:
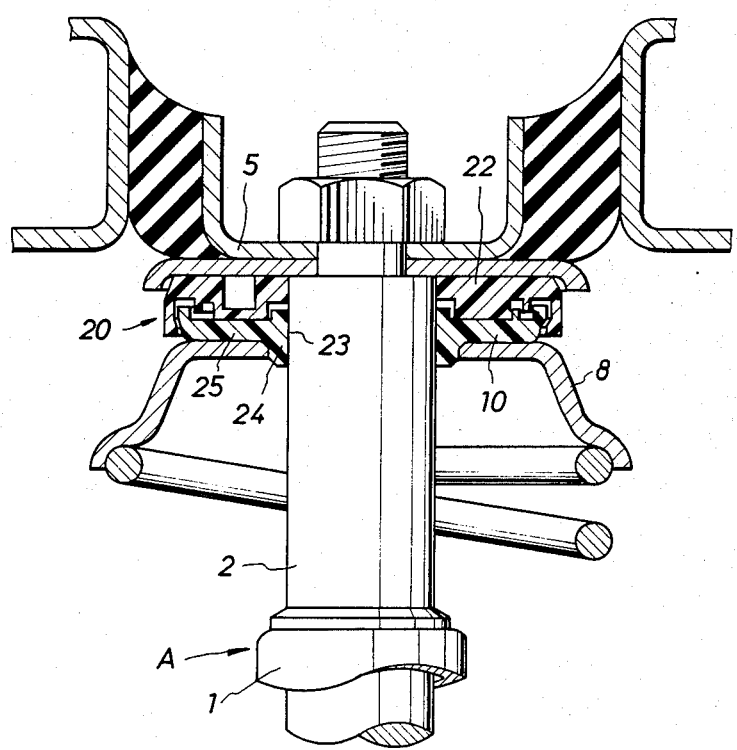
FIG. 10 is a longitudinal cross sectional view of a strut assembly equipped with a second thrust bearing according to the present invention.
Figure 11:
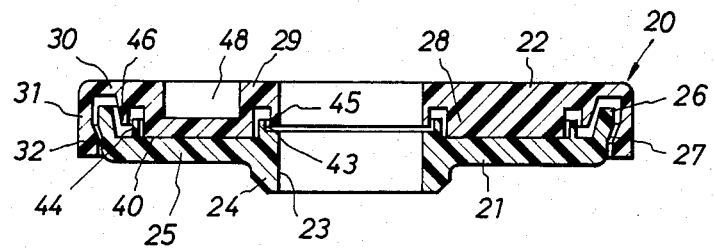
FIG. 11 is a longitudinal cross sectional view of one embodiment of the third thrust bearing according to the present invention.
Figure 12:
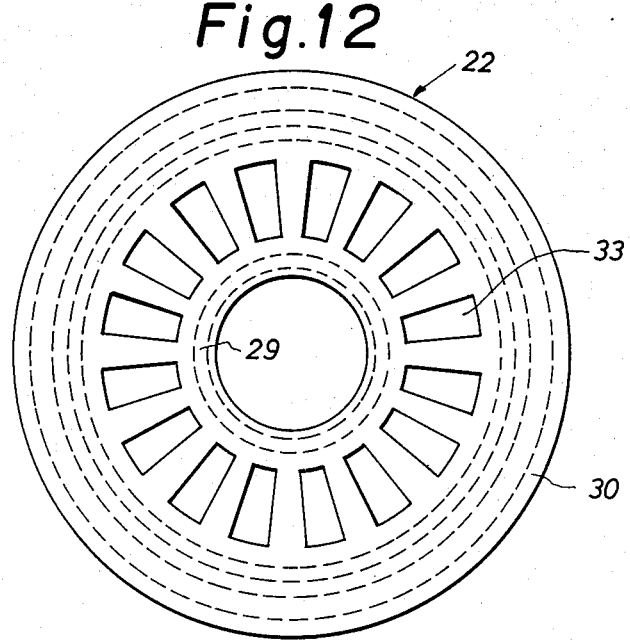
FIG. 12 is a plan view for the bearing body shown in FIG. 11.
Figure 13:
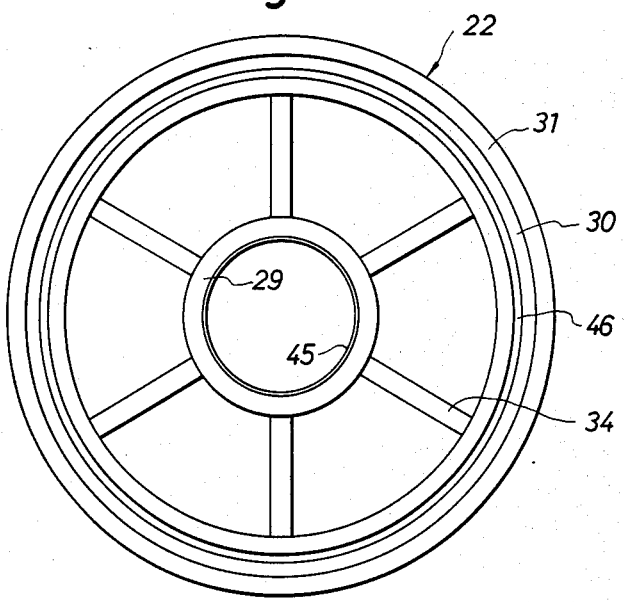
FIG. 13 is a bottom view for the bearing body shown in FIG. 11.
Figure 14:
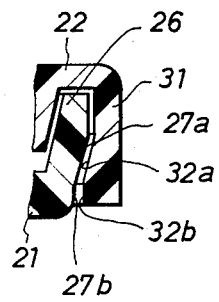
FIG. 14 is an enlarged cross sectional view for a part in a snap-fit portion shown in FIG. 11.

FIG. 10 illustrates an embodiment in which the second thrust bearing 20 described above is applied to a strut assembly A.

Specifically, the piston rod 2 of the strut 1 passes through the penetration aperture 23 in the cylindrical portion 24 of the casing 21, the outer circumferential surface of the cylindrical portion 24 of the casing 21 is fitted into the aperture of the upper spring seat 8, the lower surface of the collar portion 25 of the casing 21 is abutted against the flat portion 10 of the seat 8 and the upper surface of the bearing body 22 is abutted against the mounting member 5.

Explanation will be made specifically for one embodiment of a third thrust bearing according to the present invention referring to FIGS. 11 through 14 of the accompanying drawings.

A thrust bearing 20 comprises a casing 21 made of synthetic resin and a bearing body 22 made of synthetic resin slidably fitted to the casing 21.

The casing 21 includes a cylindrical portion 24 having a penetration aperture 23 being along a longitudinal direction thereof, an annular first lower lip portion 43 disposed to an upper end surface of the cylindrical portion 24 and having an aperture of a diameter enlarging with a step from the penetration aperture 23, a large width collar portion 25 formed integrally with an outer circumferential surface at the end of the cylindrical portion 24, an annular protruded portion 26 formed integrally with an outer circumferential edge of the collar portion 25, an engaging portion 27 formed to an outer circumferential surface of the protruded portion 26 and an annular second lower lip portion 44 coaxially formed with the penetration aperture 23 at an upper surface of the collar portion 25 and defining an annular groove 40 in cooperation with the annular first lower lip portion 43.

The engaging portion 27 consists of a tapered surface portion 27a formed from the outer circumferential surface of the protruded portion 26 to the lower circumferential surface of the collar portion 25 and a cylindrical surface portion 27b in continuous with the tapered surface portion 27a and reaching the lower surface of the collar portion 25.

The bearing body 22 includes a cylindrical bearing portion 28, an annular inner collar portion 29 formed integrally with an upper end of an inner circumferential surface of the bearing portion 28, an annular first upper lip portion 45 protruding downwardly in continuous with an inner circumferential edge of the collar portion 29 and having an inner diameter equal with the diameter of the penetration aperture 23 of the casing 21 and an outer diameter smaller than the inner diameter of the first lower lip portion 43, an annular outer collar portion 30 formed integrally with an upper end at the outer circumferential surface of the bearing portion 28, an annular suspended portion 31 formed integrally with an outer circumferential edge of the collar portion 30, an engaging hook portion 32 formed at a lower end of the suspended portion 31 and an annular second upper lip portion 46 formed coaxially with the bearing portion 28 to a lower surface of the collar portion 30 and having an inner diameter greater than an outer diameter of the second lower lip portion 44 formed to the upper surface of the collar portion 25 of the casing 21.

The hook portion 32 consists of a tapered surface portion 32a corresponding to the tapered surface portion 27a that constitutes the engaging portion 27 of the casing 21 and a cylindrical surface portion 32b in continuous with the tapered surface portion 32a and corresponding to the cylindrical surface portion 27b of the engaging portion 27.

The bearing body 22 is fitted rotatably to the casing 21 by snap-fitting the hook portion 32 of the suspended portion 31 with the engaging portion 27 of the casing 21 and by radially overlapping the ends of the first and second upper lip portions 45, 46 respectively with the first and second lower lip portions 43, 44 of the casing 21, whereby tight seals are formed by the labyrinth effect in the snap-fit portion, in the first upper and lower lip portions and in the second upper and lower lip portions.

A plurality of recesses 33 are formed radially at the upper surface of the bearing portion 28 of the bearing body 22, so that the thickness of the bearing body 22 is made uniform as much as possible by the recesses 33.

A plurality of grooves 34 are formed each at a circumferential pitch at the lower surface of the bearing portion 28 of the bearing body 22 and each groove 34 is formed radially from the inner circumferential surface to the outer circumferential surface, and the grooves 34 constitute an oil reservoir for grease or like other lubricant. The bearing portion 28 of the bearing body 22 is disposed within the groove 40 such that the lower surface of the bearing portion 28 is slidably abutted against the bottom surface of the groove 40 of the casing 21.

The sliding face defined with the lower surface of the bearing portion 28 of the bearing body 22 and the bottom face of the groove 40 is protected against the intrusion of dust or the like from the inner and the outer circumferential surfaces of the thrust bearing 20 by the labyrinth effect due to the tight seals formed in the snap-fit portion, in the overlapped portion between the first upper and lower lip portions 45, 43 and the overlapped portion between the second upper and lower lip portions 46, 44 respectively.

Figure 15:
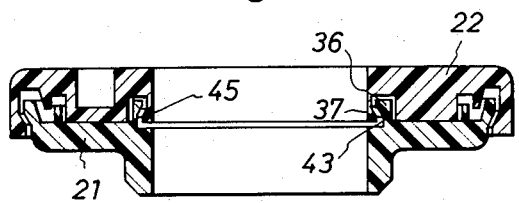
FIG. 15 is a longitudinal cross sectional view of another embodiment of the third thrust bearing according to the present invention.

FIG. 15 is a longitudinal cross sectional view illustrating another embodiment of the third thrust bearing according to the present invention.

In this embodiment, an engaging portion 36 is formed to the inner circumferential surface of the first lower lip portion 43 of the casing 21, while an engaging hook portion 37 is formed to the outer circumferential surface of the first upper lip portion 45 of the bearing body 22 in the aforementioned embodiment of the third thrust bearing. Both of the engaging portion 36 and the hook portion 37 are snap-fit to each other and fitted in a relatively rotatable manner.

Figure 16:
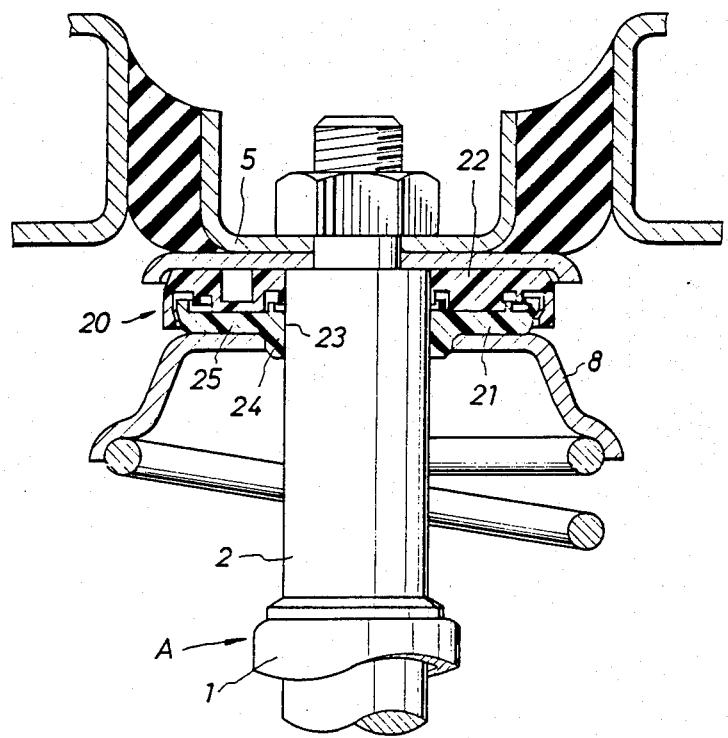
FIG. 16 is a longitudinal cross sectional view of a strut assembly equipped with a third thrust bearing according to the present invention.

FIG. 16 illustrates an embodiment in which one embodiment of the third thrust bearing described above is applied to a strut assembly A.

Specifically, the piston rod 2 of the strut 1 passes through the penetration aperture 23 in the cylindrical portion 24 of the casing 21, the outer circumferential surface of the cylindrical portion 24 of the casing 21 is fitted into the aperture of the upper spring seat 8, the lower surface of the collar portion 25 of the casing 21 is abutted against the flat portion 10 of the seat 8 and the upper surface of the bearing body 22 is abutted against the mounting member 5.

Figure 19:
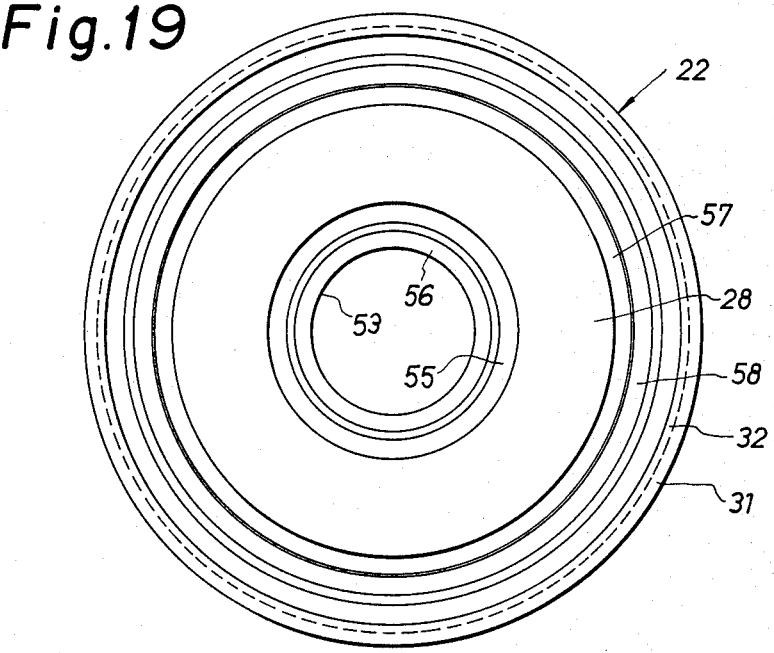
FIG. 19 is a bottom view for the bearing body shown in FIG. 17.

Explanation will be made specifically for one embodiment of a fourth thrust bearing according to the present invention referring to FIGS. 17 through 19 of the accompanying drawings.

A thrust bearing 20 comprises a casing 21 made of synthetic resin and a bearing body 22 made of synthetic resin slidably fitted to the casing 21.

The casing 21 includes a cylindrical portion 24 having a penetration aperture 23 being along a longitudinal direction thereof, a large width collar portion 25 formed integrally with an outer circumferential surface at the end of the cylindrical portion 24, an annular protruded portion 26 formed integrally with an outer circumferential edge of the collar portion 25, an engaging step 50 formed to the outer circumferential surface of the protruded portion 26, a substantially cylindrical first bearing portion 51 formed integrally with and protruded from an upper surface of the collar portion 25 and an annular ridge portion 52 formed in continuous with the inner circumferential edge of the bearing portion 51 and protruded from the end of the bearing portion 51.

The bearing body 22 comprises a disk-like portion 54 having at its central portion thereof a circular aperture 53 in communication with the penetration aperture 23 of the casing 21, a cylindrical second bearing portion 28 formed integrally with the lower surface of the disk-like portion 54, an annular inner protruded portion 56 spaced apart from an inner circumferential surface of the bearing portion 28 by an annular first groove 55, protruded at a leading end thereof from an end face of the bearing portion 28 and formed in continuous with the circular aperture 53, an annular outer protruded portion 58 spaced apart from an outer circumferential surface of the bearing portion 28 by a second annular groove 57 and protruded at a leading end thereof from the end face of the bearing portion 28 and an annular suspended portion 31 formed at an outer circumferential edge of the disk-like portion 54 and having an engaging hook portion 32 at a leading end thereof.

The bearing body 22 is fitted rotatably to the casing 21 by snap-fitting the hook portion 32 of the suspended portion 31 with the engaging step 50 of the casing 21 such that the end face of the bearing portion 28 is abutted slidably against the end face of the bearing portion 51 at the upper surface of the collar portion 25 and the ends of the inner and the outer protrusions 56, 58 are protruded from the end faces of the bearing portions 28, 51 respectively.

Since the sliding face between the end face of the bearing portion 28 and the end face of the bearing portion 51 is formed at a position higher than the upper surface 59 of the collar portion 25 by the combination of the casing 21 and the bearing body 22 and since the inner and outer protrusions 56, 58 of the bearing body 22 are disposed while being protruded from the sliding face, intrusion of dust or the like from the outside to the sliding face can be prevented by the labyrinth effect due to the tight seal formed in the inner and outer circumferential edges of the sliding face and the tight seal formed in the snap-fit portion between the bearing member 22 and the casing 21.

Figure 20:
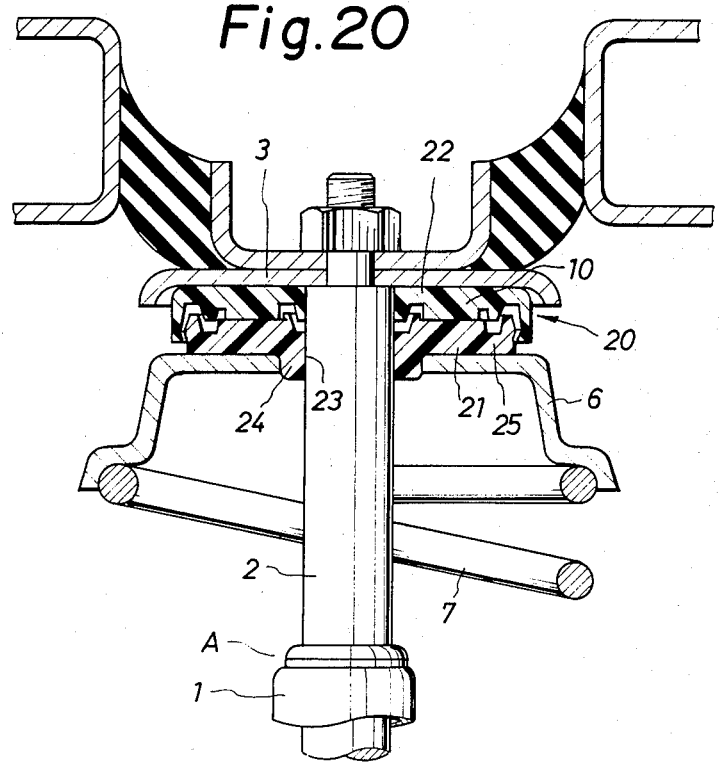
FIG. 20 is a longitudinal cross sectional view of a strut assembly equipped with a fourth thrust bearing according to the present invention.

FIG. 20 illustrates an embodiment in which the thrust bearing 20 comprising one embodiment of the fourth thrust bearing described above is applied to the strut assembly A.

Specifically, the piston rod 2 of the strut 1 passes through the penetration aperture 23 in the cylindrical portion 24 of the casing 21, the outer circumferential surface of the cylindrical portion 24 of the casing 21 is fitted into the aperture of the upper spring seat 8, the lower surface of the collar portion 25 of the casing 21 is abutted against the flat portion 10 of the seat 8 and the bearing body 22 is abutted against the mounting member 5.

Figure 21:
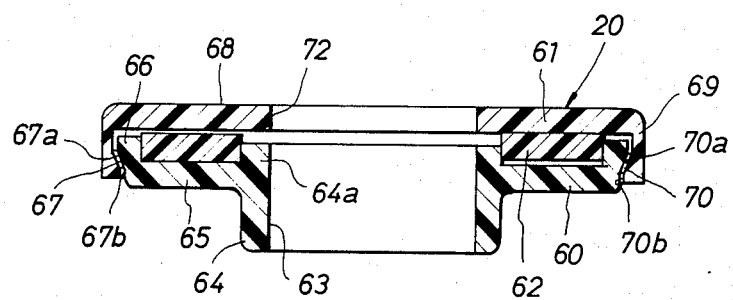
FIG. 21 is a longitudinal cross sectional view of one embodiment of the fifth thrust bearing according to the present invention.
Figure 22:
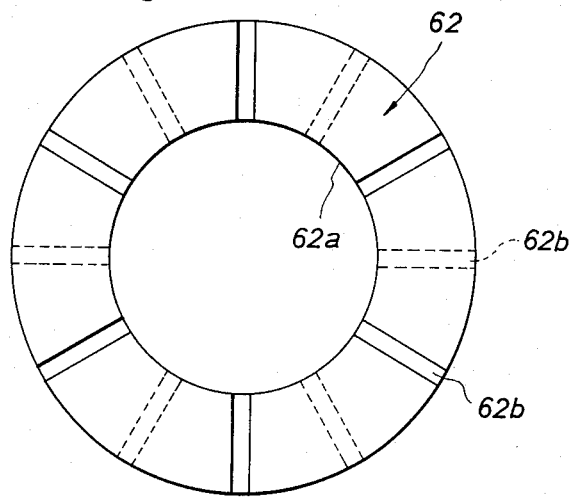
FIG. 22 is a plan view for the bearing piece shown in FIG. 21.

Explanation will be made specifically for one embodiment of a fifth thrust bearing according to the present invention referring to FIGS. 21 and 22 of the accompanying drawings.

A thrust bearing 20 comprises a lower casing 60 made of synthetic resin, an upper casing 61 made of synthetic resin and a bearing piece 62 made of synthetic resin disposed within the upper and lower casings 60, 61.

The lower casing 60 includes a cylindrical portion 64 having a penetration aperture 63 being along a longitudinal direction thereof, a large width collar portion 65 formed integrally with an outer circumferential surface of the cylindrical portion 64 in a state where one end 64a of the cylindrical portion 64 is protruded therefrom, an annular protruded portion 66 formed integrally with an outer circumferential edge of the collar portion 65 and an engaging portion 67 formed to an outer circumferential surface of the protruded portion 66.

The engaging portion 67 consists of a tapered surface portion 67a formed from an outer circumferential surface of the protruded portion 66 to a lower surface of the collar portion 65 and a cylindrical surface portion 67b in continuous with the tapered surface portion 67a and reaching the lower surface of the collar portion 65.

The casing 61 includes a disk-like flat portion 68, a circular aperture 72 formed at a center of the flat portion 68 and having the same diameter as that of the penetration aperture 63, an annular suspended portion 69 formed integrally with an outer circumferential edge of the flat portion 68 and an engaging hook portion 70 formed at a lower end of the suspended portion 69. The hook portion 70 consists of a tapered surface portion 70a corresponding to the tapered surface portion 67a constituting the engaging portion 67 of the casing 60 and a cylindrical surface portion 70b in continuous with the tapered surface portion 70a and corresponding to the cylindrical surface portion 67b of the engaging portion 67.

The casing 61 is fitted rotatably to the casing 60 by snap-fitting the hook portion 70 of the suspended portion 69 with the engaging portion 67 of the casing 60, thereby a tight seal is formed by the labyrinth effect in the snap-fit portion.

The bearing piece 62 comprises an annular plate having an inner aperture 62a of an inner diameter greater than the outer diameter of the cylindrical portion 64 of the casing 60 and an outer diameter smaller than the inner diameter of the protruded portion 66 of the casing 60.

A plurality of grooves 62b are formed radially from the inner aperture 62a to the outer circumferential surface alternately on both end faces of the bearing piece 62 at a phase difference of 30 degree with each other in the circumferential direction, and the grooves 62b constitute an oil reservoir for grease or like other lubricant. The bearing piece 62 is disposed within the casings 60, 62 such that the inner aperture 62a is engaged with the outer circumferential surface of one end 64a of the cylindrical portion 64 and the both end faces of the bearing piece 62 are slidably abutted against the lower surface of the disk-like portion 68 of the casing 61 and the upper surface of the collar portion 65 of the casing 60 respectively.

Figure 23:
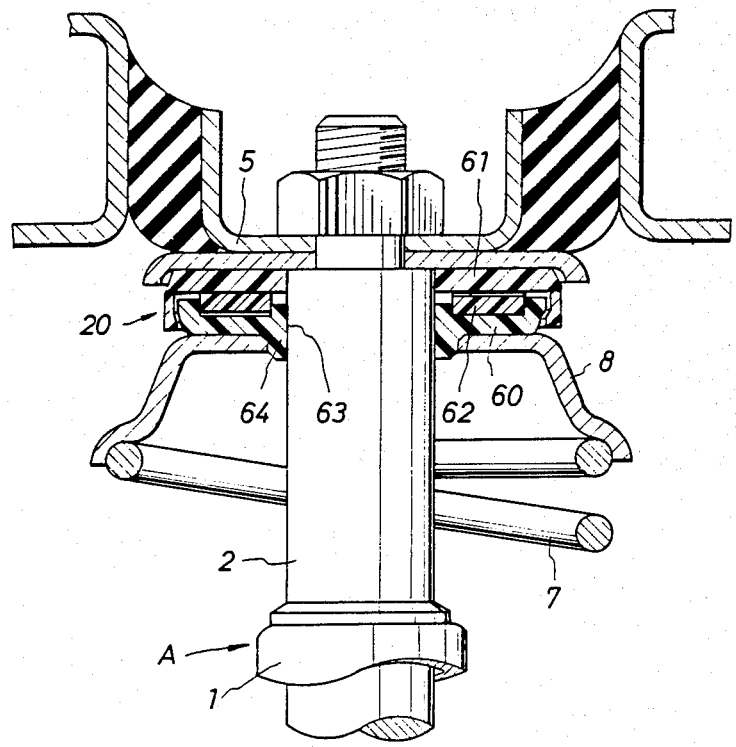
FIG. 23 is a longitudinal cross sectional view of a strut assembly equipped with a fifth thrust bearing according to the present invention.

FIG. 23 illustrates an embodiment in which one embodiment of the fifth thrust bearing according to the invention as described above is applied to the strut assembly A.

Specifically, the piston rod 2 of the strut 1 passes through the penetration aperture 63 of the cylindrical portion 64 of the casing 60 and the circular aperture 72 of the disk-like portion 68 of the casing 61, the cylindrical portion 64 of the casing 60 is fitted into the aperture of the upper spring seat 8 and the lower surface of the collar portion 65 of the casing 60 is abutted against the flat portion 10 of the seat 8, and the upper surface of the disk-like portion 68 of the casing 61 is abutted against the mounting member 5.

Figure 24:
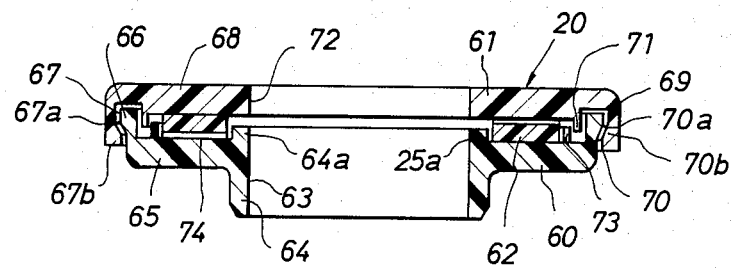
FIG. 24 is a longitudinal cross sectional view of one embodiment of a sixth thrust bearing according to the present invention.
Figure 25:
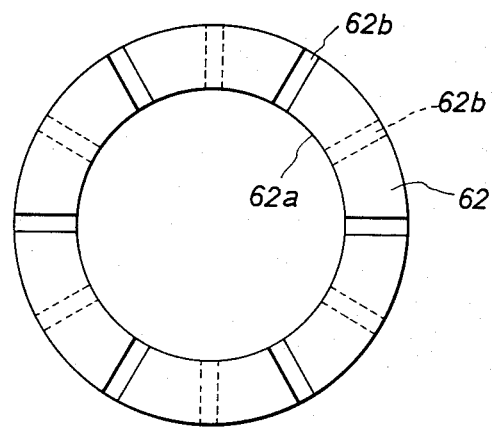
FIG. 25 is a plan view for the bearing piece shown in FIG. 24.

Explanation will be made specifically for one embodiment of a sixth thrust bearing according to the present invention referring to FIGS. 24 and 25 of the accompanying drawings.

A thrust bearing 20 comprises a lower casing 60 made of synthetic resin, an upper casing 61 made of synthetic resin and a bearing piece 62 made of synthetic resin disposed within the upper and lower casings 61, 60.

The lower casing 60 includes a cylindrical portion 64 having a penetration aperture 63 being along a longitudinal direction thereof, a large width collar portion 65 formed integrally with an outer circumferential surface at the end of the cylindrical portion 64 in a state where one end 64a of the cylindrical portion 64 is protruded therefrom, an annular protruded portion 66 formed integrally with an outer circumferential edge of the collar portion 65, an engaging portion 67 formed to the outer circumferential surface of the protruded portion 66 and an annular lower lip 73 formed coaxially with the penetration aperture 63 at the upper surface of the collar portion 65 and defining an annular groove 74 in cooperation with one end 64a of the cylindrical portion 64.

The engaging portion 67 consists of a tapered surface portion 67a formed from an outer circumferential surface of the protruded portion 66 to a lower surface of the collar portion 65 and a cylindrical surface portion 67b in continuous with the tapered surface portion 67a and reaching the lower surface of the collar portion 65.

The casing 61 includes a disk-like flat portion 68, a circular aperture 72 formed at a center of the disk-like portion 68 and having the same diameter as that of the penetration aperture 63, an annular suspended portion 69 formed integrally with an outer circumferential edge of the disk-like portion 68, an engaging hook portion 70 formed at a lower end of the suspended portion 69 and an annular upper lip portion 71 formed coaxially with the circular aperture 72 at a lower surface of the disk-like portion 68 and having an inner diameter greater than the lower lip 73 formed to the upper surface of the collar portion 65 of the casing 60. The hook portion 70 consists of a tapered surface portion 70a corresponding to the tapered surface portion 67a constituting the engaging portion 67 of the casing 60 and a cylindrical surface portion 70b in continuous with the tapered surface portion 70a and corresponding to the cylindrical surface portion 67b of the engaging portion 67.

The casing 61 is fitted rotatably to the casing 60 by snap-fitting the hook portion 70 of the suspended portion 69 with the engaging portion 67 of the casing 60 and by radially overlapping the end of the upper lip portion 73 with the lower lip portion 71 of the casing 60, whereby tight seals are formed by the labyrinth effect in the snap-fit portion and in the upper and lower lip portions.

The bearing piece 62 comprises an annular plate having an inner aperture 62a of an inner diameter greater than the outer diameter of one end 64a of the cylindrical portion 64 and an outer diameter smaller than the inner diameter of the lower lip portion 73 of the casing 21.

A plurality of grooves 62b are formed radially from the inner aperture 62a to the outer circumferential surface alternately on both end faces of the bearing piece 62 at a phase difference of 30 degree with each other in the circumferential direction, and the grooves 62b constitute an oil reservoir for grease or like other lubricant.

The bearing piece 62 is disposed within the groove 74 of the casing 60 such that the inner aperture 62a is engaged with the outer circumferential surface of one end 64a of the cylindrical portion 64, and the both end faces of the bearing piece 62 are slidably abutted against the lower surface of the disk-like portion 68 of the casing 61 and the bottom surface of the groove 74 of the casing 60 respectively.

The sliding face of the bearing defined with both end faces of the bearing piece 62, the lower surface of the disk-like portion 68 of the casing 61 and the bottom face of the groove 74 of the casing 60 abutted slidably against the both end faces is protected against the intrusion of dust or the like by the labyrinth effect due to tight seals formed in the snap-fit portion and in the overlapped portions between the upper and lower lip portions 71, 73 of the casings 60, 61.

Figure 26:
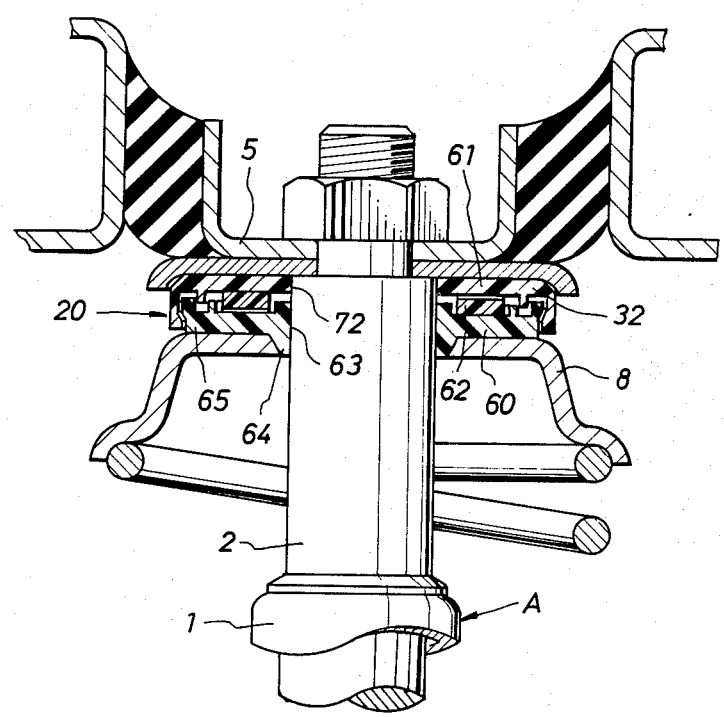
FIG. 26 is a longitudinal cross sectional view of a strut assembly equipped with a sixth thrust bearing according to the present invention.

FIG. 26 illustrates an embodiment in which one embodiment of the sixth thrust bearing according to the present invention is applied to a strut assembly A.

Specifically, the piston rod 2 of the strut 1 passes through the penetration aperture 63 of the cylindrical portion 64 of the casing 60 and through the circular aperture 72 of the disk-like portion 68 of the casing 61, the cylindrical portion 64 of the casing 60 is fitted into the aperture of the upper spring seat 8, the lower surface of the collar portion 65 of the casing 60 is abutted against the flat portion 10 of the seat 8, and the upper surface of the disk-like portion 68 of the casing 61 is abutted against the mounting member 5.

Figure 27:
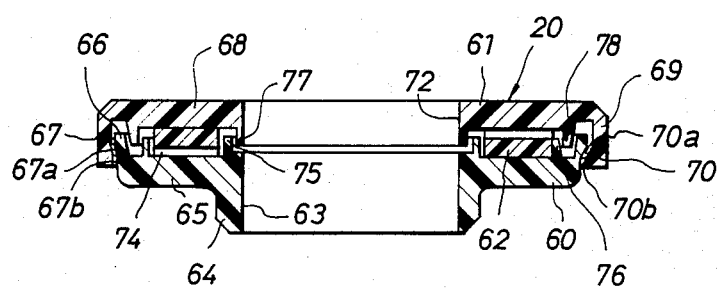
FIG. 27 is a longitudinal cross sectional view of one embodiment of a seventh thrust bearing according to the present invention.
Figure 28:
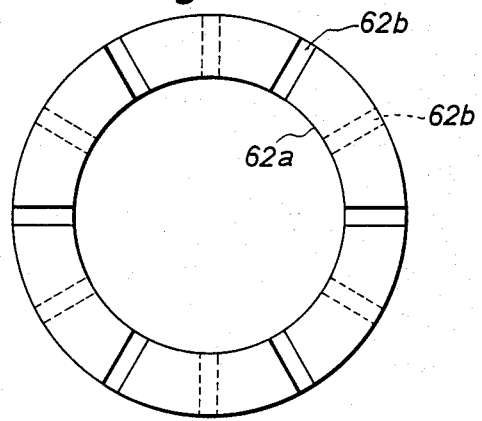
FIG. 28 is a plan view for the bearing piece shown in FIG. 27.

Explanation will be made specifically for one embodiment of the seventh thrust bearing according to the present invention referring to FIGS. 27 and 28 of the accompanying drawings.

A thrust bearing 20 comprises a lower casing 60 made of synthetic resin, an upper casing 61 made of synthetic resin and a bearing piece 62 made of synthetic resin disposed within the upper and lower casings 61, 60.

The casing 60 includes a cylindrical portion 64 having a penetration aperture 63 being along a longitudinal direction thereof, an annular first lower lip portion 75 disposed to an upper end face of the cylindrical portion 64 and having an aperture of a diameter enlarging with a step from the penetration aperture 63, a large width collar portion 65 formed integrally with an outer circumferential surface at the end of the cylindrical portion 64 in a state where one end of the cylindrical portion 64 is protruded therefrom, an annular protruded portion 66 formed integrally with an outer circumferential edge of the collar portion 65, an engaging portion 67 formed to an outer circumferential surface of the protruded portion 66 and an annular second lower lip portion 76 formed coaxially with the penetration aperture 63 at an upper surface of the collar portion 65 and defining an annular groove 74 in cooperation with the first lower lip portion 75. The inner diameter of the first lower lip 75 is enlarged than that of the penetration aperture 63.

The engaging portion 67 consists of a tapered surface portion 67a formed from the outer circumferential surface of the protruded portion 66 to the lower surface of the collar portion 65 and a cylindrical surface portion 67b continuous with the tapered surface portion 67a and reaching the lower surface of the collar portion 65.

The casing 61 includes a disk-like flat portion 68, a circular aperture 72 formed at a center of the disk-like portion 68, an annular first upper lip 77 formed integrally with and extended downwardly from the inner circumferential edge of the disk-like portion 68 and having an outer diameter smaller than the inner diameter of the first lower lip portion 75, an annular suspended portion 69 formed integrally with the outer circumferential edge of the disk-like portion 68, an engaging hook portion 70 formed at a lower end of the suspended portion 69 and an annular second upper lip portion 78 formed coaxially with the circular aperture 72 to a lower surface of the disk-like portion 68 and having an inner diameter greater than that of the second lower lip portion 76. The hook portion 70 consists of a tapered surface portion 70a corresponding to the tapered surface portion 67a constituting the engaging portion 67 of the casing 60 and a cylindrical surface portion 70b contiguous with the tapered surface portion 67a and corresponding to the cylindrical surface 67b of the engaging portion 67.

The casing 61 is fitted rotatably to the lower casing 60 by snap-fitting the hook portion 70 of the suspended portion 69 with the engaging portion 67 of the casing 60 and by radially overlapping the ends of the first upper lip portion 77 and the second upper lip portion 78 with the first lower lip portion 75 and the second lower lip portion 76 respectively, whereby tight seals are formed by the labyrinth effect in the snap-fit portion, in the overlapped portion between the first upper and lower lip portions and in the overlapped portion between the second upper and lower lip portions.

The bearing piece 62 comprises an annular plate having an inner aperture 62a of an inner diameter greater than the outer diameter of the first lower lip portion 75 and an outer diameter smaller than the inner diameter of the second lower lip portion 76 of the casing 60.

A plurality of grooves 62b are formed radially from the inner aperture 62a to the outer circumferential surface alternately on both end faces of the bearing piece 62 at a phase difference of 30 degree with each other in the circumferential direction, and the grooves 62b constitute an oil reservoir for grease or like other lubricant.

The bearing piece 62 is disposed within the groove 74 of the casing 60 such that the inner aperture 62a is engaged with the other circumferential surface of one end 64a of the cylindrical portion 64, both end faces of the bearing piece 62 are slidably abutted against the lower surface of the disk-like portion 68 of the casing 61 and the bottom face of the groove 74 of the casing 60 respectively.

The sliding face of the bearing defined with the both end faces of the bearing piece 62, the lower surface of the disk-like portion 68 of the casing 61 and the bottom face of the groove 74 of the casing 60 abutted slidably against the both end faces is protected against the intrusion of the dust or the like from the inner and the outer circumferential surfaces of the bearing piece 62 by the labyrinth effect due to the tight seals formed in the snap-fit portion between the casing 60, 61, in the overlapped portion between the upper and lower lip portions 77, 75 and in the overlapped portion between the second upper and lower lip portions 78, 76 respectively.

Figure 29:
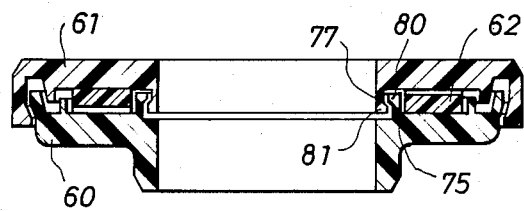
FIG. 29 is a longitudinal cross sectional view of another embodiment of a seventh thrust bearing according to the present invention.

FIG. 29 is a longitudinal cross sectional view illustrating another embodiment of the seventh thrust bearing according to the present invention.

Specifically, in this embodiment, another engaging portion 80 is formed to the inner circumferential surface of the first lower lip portion 75 of the casing 60, while another engaging hook portion 81 is formed to the outer circumferential surface of the upper lip portion 77 at the central of the casing 61 in the aforementioned embodiment of the seventh thrust bearing. Both of the engaging portion 80 and the hook portion 81 are snap-fit to each other in a relatively rotatably manner.

Figure 30:
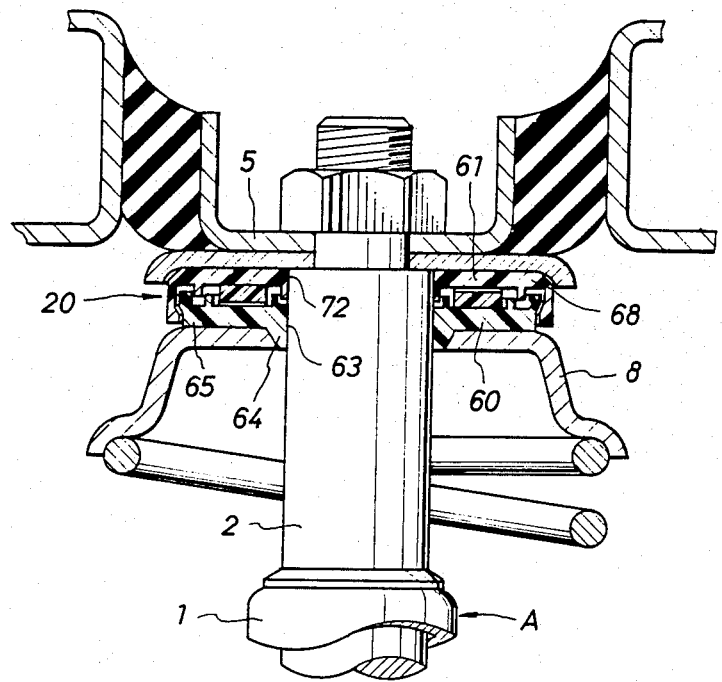
FIG. 30 is a longitudinal cross sectional view of a strut assembly equipped with a seventh thrust bearing according to the present invention.

FIG. 30 illustrates an embodiment in which one embodiment of the seventh thrust bearing according to the present invention is applied to a strut assembly A.

Specifically the piston rod 2 of the strut 1 passes through the penetration aperture 63 in the cylindrical portion 64 of the casing 60 and the circular aperture 72 of the disk-like portion 68 of the casing 61, the cylindrical portion 64 of the casing 60 is fitted into the aperture of the upper spring seat 8, the lower surface of the collar portion 65 of the casing 60 is abutted against the flat portion 10 of the seat 8, and the upper surface of the disk-like portion 68 of the casing 61 is abutted against the mounting member 5.

What is claimed is:

1. A thrust bearing for use with an automobile thrust-strut type suspension having a strut incorporating a shock absorber, a piston rod inserted in the shock absorber, a mounting member for supporting the piston rod to the automobile body, and an upper spring seat loosely engaging the piston rod, the mounting member and the upper spring seat having opposed, substantially planar surfaces offset from each other and defining an annular space between them, said bearing being adapted to be received in the annular space between the upper spring seat and the mounting member and adapted to receive the piston rod therethrough, said bearing comprising:

a lower casing made of synthetic resin and having a longitudinal axis, said lower casing including:

a cylindrical portion having a substantially planar upper surface, a lower surface, an outer circumferential surface, a penetration aperture of circular cross-section coaxial with said longitudinal axis of said lower casing, and an annular inner lower lip portion extending upwardly from said upper surface adjacent and offset stepwise from said penetration aperture, said penetration aperture being adapted to receive the piston rod of the suspension therein, said inner lower lip defining a cylindrical aperture having a diameter slightly greater than that of said penetration aperture, and said inner lower lip portion having a distal end offset from said upper surface of said cylindrical portion; and a collar portion extending outwardly from and formed integrally with said outer circumferential surface of said cylindrical portion, said collar portion having substantially planar upper and lower surfaces and an outer circumferential surface, said lower surface of said collar portion being substantially offset from said lower surface of said cylindrical portion and adapted to matingly engage the upper surface of the upper spring seat of the suspension, and said collar portion including an annular protruded portion extending upwardly from said upper surface of said collar portion and formed integrally with said outer circumferential surface of said cylindrical portion, said protruded portion having an outer circumferential surface and an outwardly extending engaging portion formed on said outer circumferential surface of said protruded portion, and said collar portion further including an annular outer lower lip portion extending upwardly from said upper surface of said collar portion coaxial with said longitudinal axis of said lower casing and defining an inner annular groove in cooperation with said inner lower lip portion and an outer annular groove with said protruded portion, said outer lower lip portion having a distal end offset from said upper surface of said collar portion, and said inner annular groove having a bottom surface;

said inner annular lower lip having an outer diameter "d1" and said outer annular lower lip having an inner diameter "d2", respectively, "d1" being smaller than "d2";

an upper casing made of synthetic resin and having a longitudinal axis, said upper casing comprising a disk-like portion having substantially planar upper and lower surfaces, an outer circumferential edge, a circular aperture formed at the center thereof coaxial with said longitudinal axis of said upper casing and defining an inner circumferential edge, an annular inner upper lip portion extending downwardly from said lower surface of said disk-like portion and formed integrally with said inner circumferential edge of said disk-like portion, an annular outer upper lip portion extending downwardly from said lower surface of said disk-like portion coaxial with said longitudinal axis of said upper casing, an annular suspended portion extending downwardly from said lower surface of said disk-like portion and forged integrally with said outer circumferential edge of said disk-like portion, said upper surface of said disk-like portion being adapted to matingly engage the lower surface of the mounting member of the suspension, said circular aperture being adapted to receive the piston rod of the suspension therein, said inner and outer upper annular lip portions each having a distal end offset from said lower surface of said disk-like portion, and said suspended portion having a distal end offset from said lower surface of said disk-like portion and an engaging hook portion formed at said distal end for cooperation with said engaging portion of said protruded portion; and a bearing piece made of synthetic resin and comprising an annular plate having upper and lower surfaces and an inner diameter greater than "d1" and an outer diameter less that "d2", said bearing piece being received in said inner annular groove of said lower casing;

said hook portion of said suspended portion of said upper casing being snap-fitted with said engaging portion of said protruded portion of said lower casing to define a snap-fit portion, whereby said upper casing is fitted rotatably to said lower casing, said upper surface of said bearing piece being slidably abutted against said lower surface of said disk-like portion, said distal ends of said inner and outer upper lip portions being overlapped radially with said distal ends of said inner and outer lower lip portions, respectively, to define inner and outer overlapped portions, respectively, and said lower surface of said bearing piece being slidably abutted against said bottom surface of said inner annular groove, whereby tight seals are formed at said snap-fit portion and said inner and outer overlapped portions.

2. The bearing as claimed in claim 1, said inner upper lip portion having an engaging hook portion formed at said distal end thereof and said inner lower lip portion having an engaging portion formed at said distal end thereof for cooperation with said hook portion of said inner upper lip portion, said hook portion of said inner upper lip portion being snap-fitted and relatively rotatably engaged with said engaging portion of said inner lower lip portion.

3. The bearing as claimed in claim 1, said bearing piece having an outer circumferential surface and a plurality of grooves in said upper and lower surfaces thereof extending radially from said inner aperture to said outer circumferential surface, said grooves being in said upper and lower surfaces alternately at a phase difference of approximately 30 degrees with each other in a circumferential direction.

* * * * *

UNITED STATES PATENT AND TRADEMARK OFFICE
CERTIFICATE OF CORRECTION

PATENT NO. : 4,854,745
DATED : August 8, 1989
INVENTOR(S) : Hiroto Kamimura

It is certified that error appears in the above-identified patent and that said Letters Patent is hereby corrected as shown below:

On the title page, item [75]:

inventors, delete "Fujisawa; Shuichi Kubota, Yokohama; Masaru Iwakura, Ayase, all of Japan" and insert --Fujisawa, Japan--.

Signed and Sealed this

Seventh Day of March, 1995

Attest:

BRUCE LEHMAN

Attesting Officer    Commissioner of Patents and Trademarks